United States Patent [19]
de Oliveira

[11] Patent Number: 5,853,031
[45] Date of Patent: Dec. 29, 1998

[54] INSULATING AND FIXATION SYSTEM OF STEAM TRACERS IN FLUID TRANSPORTATION PIPINGS

[76] Inventor: Murilo Pessosa de Oliveira, Av. Parque Leste, S/N Pajucara Distrito Industrial De Maracanao, Fortaleza, Ceara, Brazil

[21] Appl. No.: 531,450
[22] Filed: Sep. 21, 1995

[30] Foreign Application Priority Data

Sep. 21, 1994 [BR] Brazil ................................. 9403801-5

[51] Int. Cl.⁶ ........................................................ F16L 9/14
[52] U.S. Cl. ......................... 138/149; 138/148; 138/156
[58] Field of Search ................................. 138/144, 111, 138/114, 148, 156

[56] References Cited

U.S. PATENT DOCUMENTS

| | | | |
|---|---|---|---|
| 4,233,816 | 11/1980 | Hensley | 138/149 X |
| 4,293,005 | 10/1981 | Kelly | 138/149 |
| 4,303,105 | 12/1981 | Rohner | 138/149 |
| 4,492,089 | 1/1985 | Rohner et al. | 138/149 X |
| 4,606,957 | 8/1986 | Cohen | 138/149 X |
| 4,653,541 | 3/1987 | Oehlschlaeger et al. | 138/149 X |
| 4,700,751 | 10/1987 | Fedrick | 138/149 |
| 5,400,602 | 3/1995 | Chang et al. | 138/149 X |

Primary Examiner—Patrick F. Brinson
Attorney, Agent, or Firm—Gary M. Nath; Nath & Associates

[57] ABSTRACT

The present invention refers to an insulating and fixation system of steam tracers in fluid transportation pipings, comprising the supply of a first internal metallic piping (50) with diameter a few larger than the piping (52) to be heated, endowed with equally spaced internal rips (54) in the longitudinal direction for arrangement and fixation of heating extensions (56) and a second external thermoplastic piping (58) being one concentrical to each other, forming an annular space (60) and presenting itself as a double wall tubular cylinder (62), said annular space (60) forming between the said first internal piping (50) and the second external piping (58) being fulfilled with insulating material (64) without any contact with the said piping (52) to be heated or external surroundings.

5 Claims, 7 Drawing Sheets

INSULATING AND FIXATION SYSTEM OF STEAM TRACERS IN FLUID TRANSPORTATION PIPINGS

Specification of Patent of Invention to "INSULATING AND FIXATION SYSTEM OF STEAM TRACERS IN FLUID TRANSPORTATION PIPINGS".

1. Field of the Invention

The present invention refers to an insulating and fixation system of steam tracers in fluid transportation pipings, having pipings that avoid the external walls of the pipe being heated, thus increasing the viscosity of the fluid inside the piping.

2. Description of the Prior Art

One of the big unsuitabilities in the pipings fluid transportation refers to the viscosity between the fluids within the pipings caused by, the piping external walls cooling, because of the cooling heating the piping many times is necessary in order to avoid the possible interruption of the fluid transportation.

The Usual Heating System of pipings is provided by steam pipes externally fixed to the pipe to be heated, and also involved with thermal insulation. Seamless copper tubes are used for steam temperatures of up to of about 200° C. and for diameters of about 1". NORMS ASTM B.88- k type extruded aluminum tube and ASTM B.210 type extruded aluminum tube are also used in such conditions. For larger diameters and higher steam temperatures, the heating tubes are made of carbon steel. This Usual Heating System of pipings has the disadvantage of providing irregular heating, even when special masses of heat transmission high coefficient are used.

The Helicoidal Heating System helps a deeper heat exchange than the Usual Heating System, but its costs are much higher, since the heating tube can comprise only between 2 and 3 meters of the main tube.

From this reality, it's necessary to provide a heating system which helps a deeper heat exchange and has lower costs. This is accomplished by using an insulating and fixation system of steam tracers in fluid transportation pipings, which uses in industrial pipings heat generated by low or mean steam (0,7 to 10 Kg/cm2) of steam or superheating.

SUMMARY OF THE INVENTION

These aims and others are reached by providing the insulating and fixation system of steam stracers in fluid transportation pipings, subject of the present invention, which comprises the supply of a first metallic internal piping with a larger diameter than the piping to be heated, endowed with internal equally distant spaced rips in the longitudinal direction for arrangement and fixation of the piping heating extensions and a second thermoplastic external piping of high mechanical resistance, one concentrical to each other, forming a annular space between the first internal piping and the second external piping fulfilled with insulating material without any contact with the piping to be insulated or external surroundings.

The double wall tubular cylinders, subject of the system of the present invention, are interconnected, one to each other, by small closing sleeves, with detail or indentation to externally support the expansion bends, while the heating extensions interconnection of each double wall tubular cylinder will made itself by welding or with connections, in a number as low as possible, after they take a vertical "U" shape.

DETAILED DESCRIPTION OF THE DRAWINGS

These objects, characteristics and and advantages of the present invention will become more evident from the following detailed description, when it will be approached together with the enclosed drawings, in which.

DETAILED DESCRIPTION OF THE PREFERRED EMBODIMENT

Figure 1:
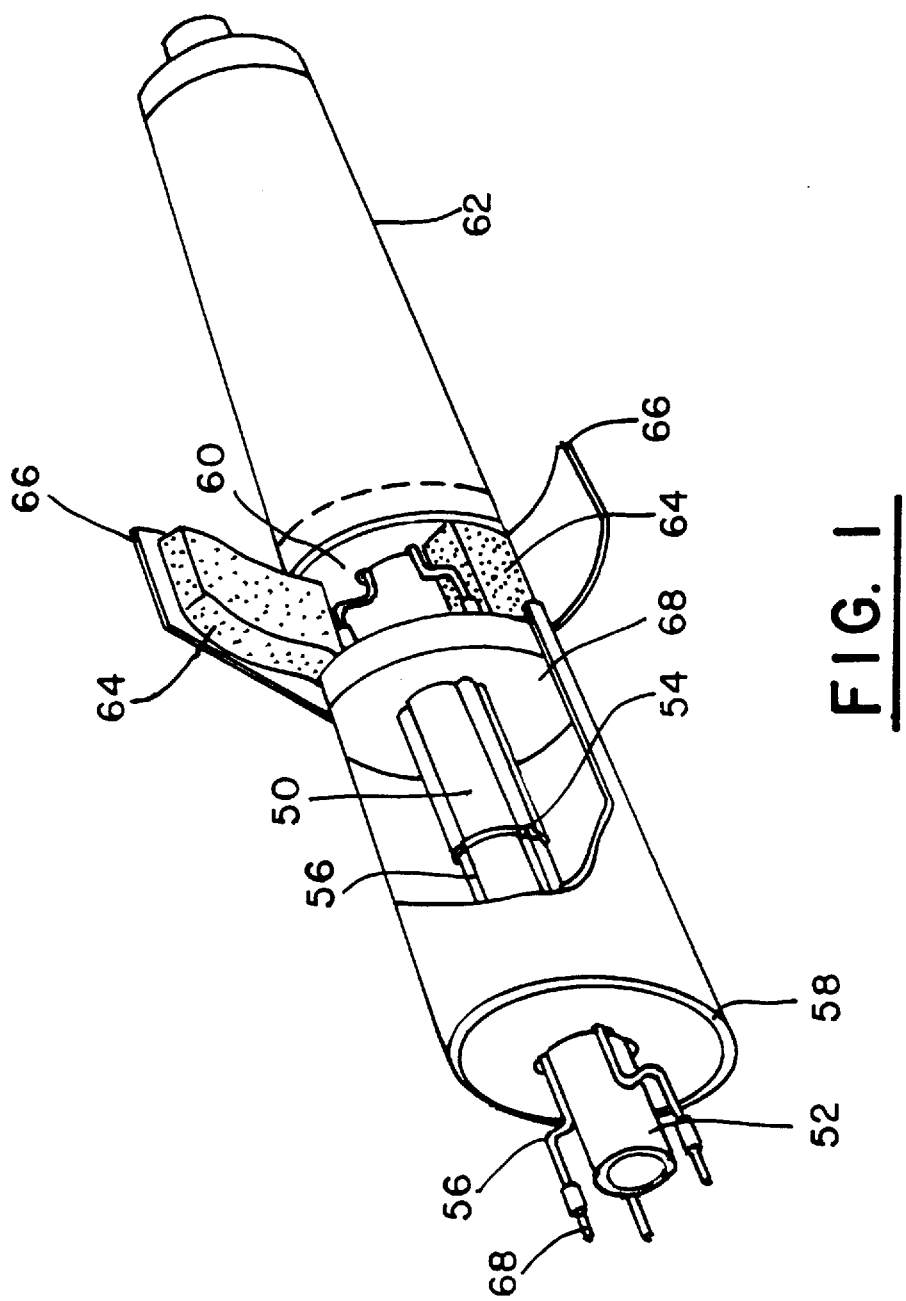
FIG. 1 is a perspective view of the double wall tubular cylinder of the system of the present invention, with section and opening.
Figure 2:
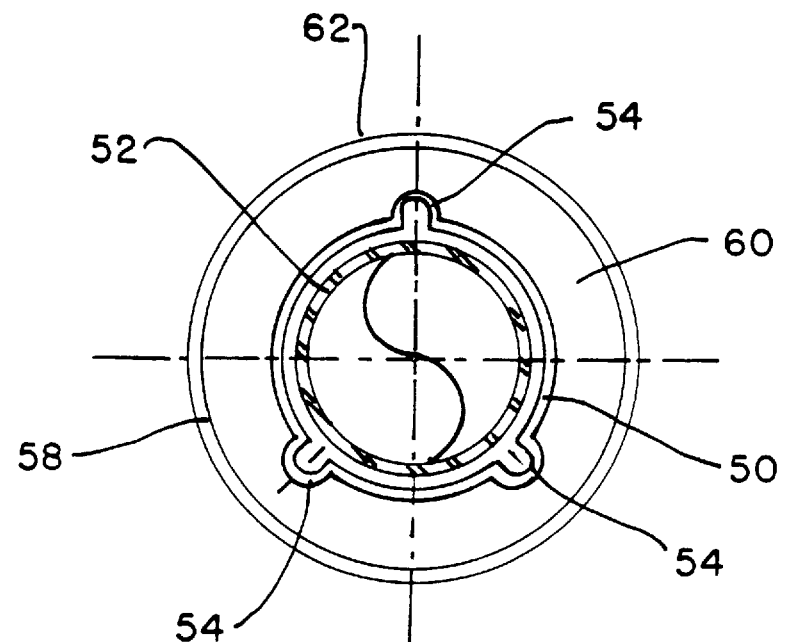
FIG. 2 is a perspective view of the cross-section of the double wall tubular cylinder without the heating extensions.
Figure 3:
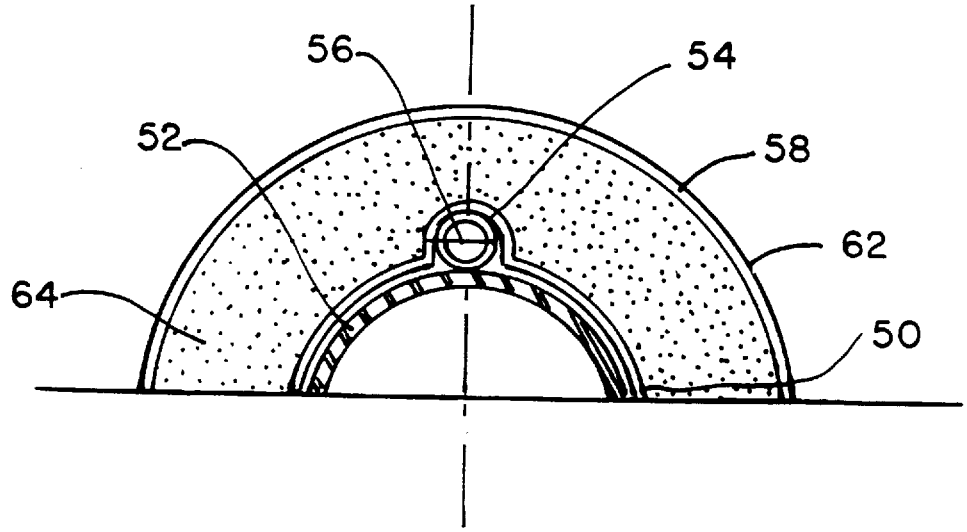
FIG. 3 is a cross section view of the upper semicircle of the double wall tubular cylinder with insulating material and a heating extension.

According to what can be deduced from FIGS. 1 to 3, the insulating and fixation system of steam tracers in fluid transportation pipings comprises the provision of a first internal metallic piping 50 with diameter a few larger than the piping 52 to be heated, endowed with equally distant internal rips 54, in the longitudinal direction, for arrangement and fixation of heating extensions 56 of the piping 52 and a second thermoplastic external piping 58 of high mechanical resistance, one concentrical to each other, forming a annular space 60 between the first internal piping 50 and the second external piping 58, being fulfilled with insulating material 64 without any contact with the piping 52 to be heated or external surroundings.

The insulating and fixation system of steam tracers in fluid transportation pipings, for its characteristics, can be used both for usual fluids and for viscous fluids and, specially for conduits with nominal diameter of 2" to 42", being of easy assembly, reducing, thus, the global costs and the execution term. The internal rips 54 provided equally distant spaced in the metallic internal piping 50, can present several diameters and being able to present the necessary number of internal rips 54 to the heating extensions 56 crossing, according to the necessities of the design.

Further, as can be seen from the FIG. 1, when necessary, the sections between the double wall tubular cylinders 62 can receive a thermoplastic protection and finishing band 66, being able to have, still, the supply of distance collars 68 which increase extraordinarily the resistance features.

In the insulating and fixation system of steam tracers in fluid transportation pipings, in the sections among the double wall tubular cylinders 62, the interconnection of the heating extensions 56 is made, being able to use the interconnection by longitudinal surfaces 68, showed in FIG. 1, or the interconnection of the heating extensions 56 with output preferably "simple U"-shaped.

Figure 4:
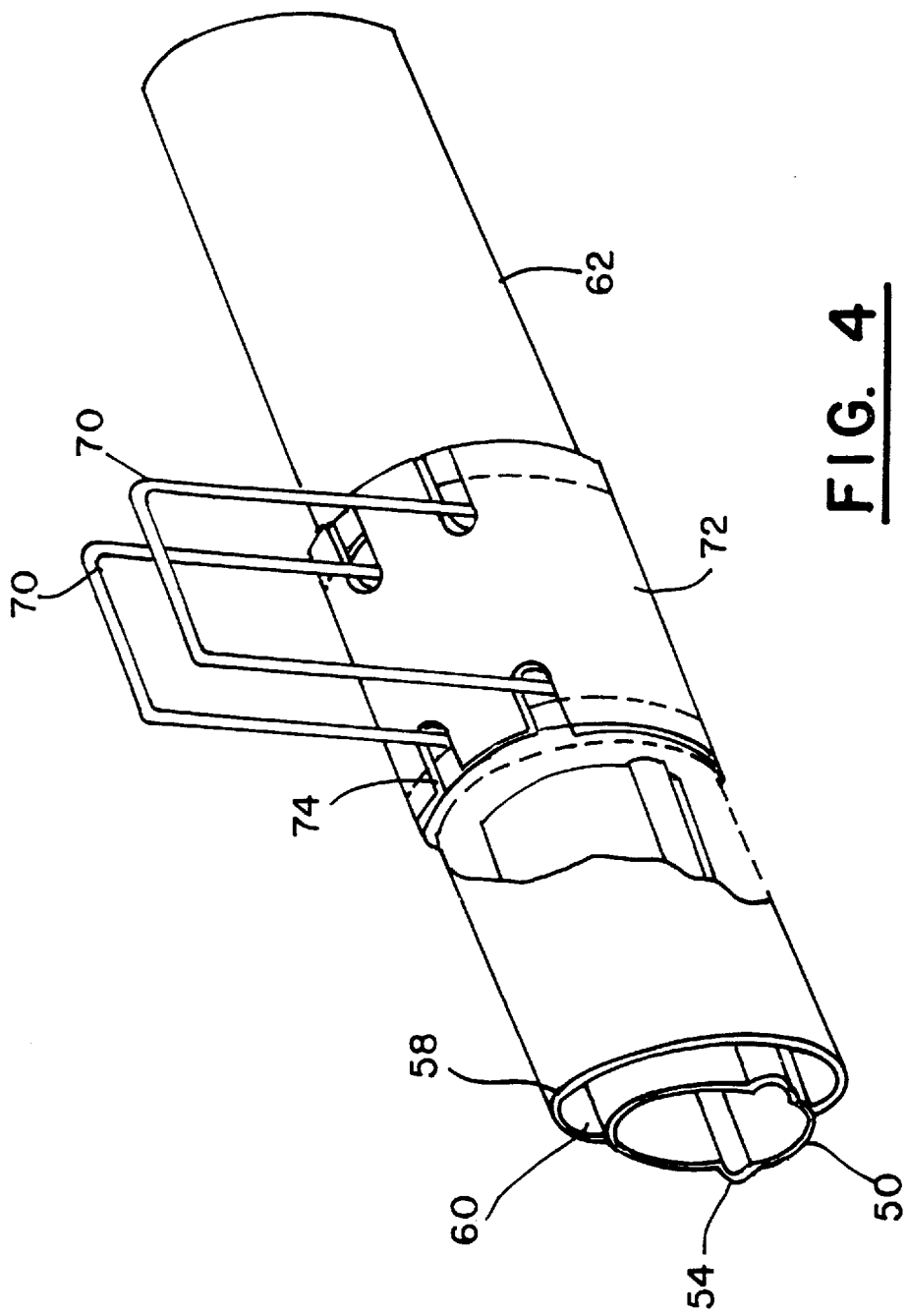
FIG. 4 is a perspective view of the double wall tubular cylinder with section and opening showing details of the interconnection of the heating extensions with welding preferably "simple U "-shaped.
Figure 5:
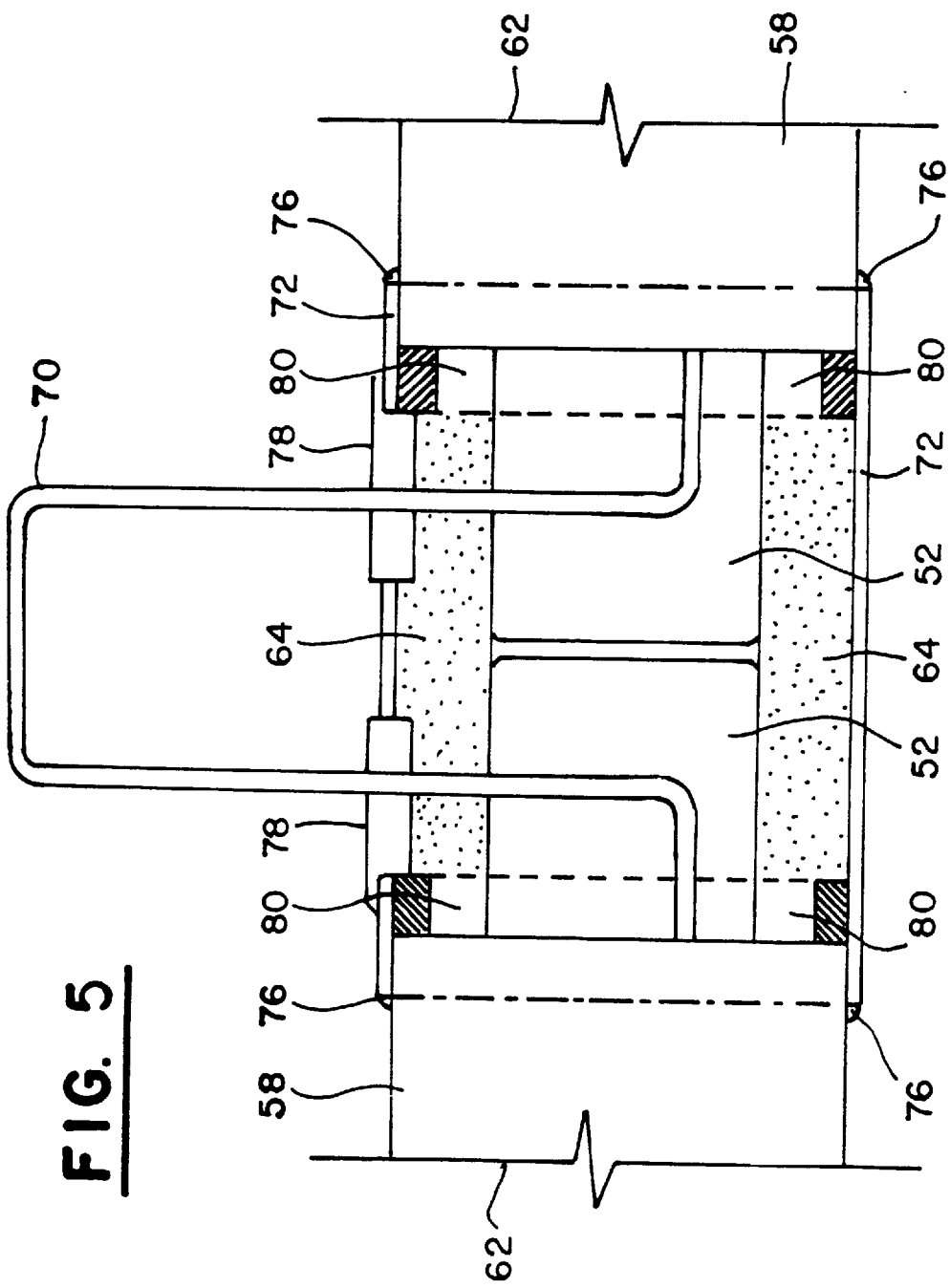
FIG. 5 is an enlarged front cut taken from FIG. 4.

In the connection of the heating extensions 56 with output preferably "simple U"-shaped, showed in FIG. 4 and with more details in FIG. 5, a thermoplastic sleeve 72 with superficial openings 74 is provided to the insertion of the vertical sections of the "simple U"-shaped outputs, with welding 76 on the perimeters of connection of the thermoplastic sleeve 72 with the second thermoplastic external piping 58 of the double wall tubular cylinder 62, with sealing material. 78 in the output of the "U" 70 and collars 80 internally provided in the thermoplastic sleeve 72 and adjacents to the insulating material 64.

Figure 6A:
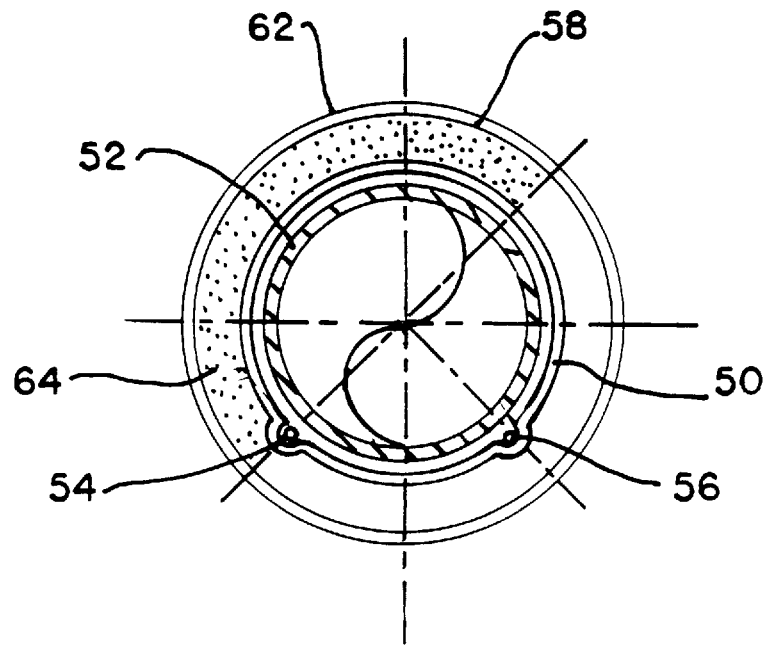
FIGS. 6A and 6B are cross-sections of double wall tubular cylinders respectively, with two and four internal rips for arrangement and fixation of heating extensions.
Figure 6B:
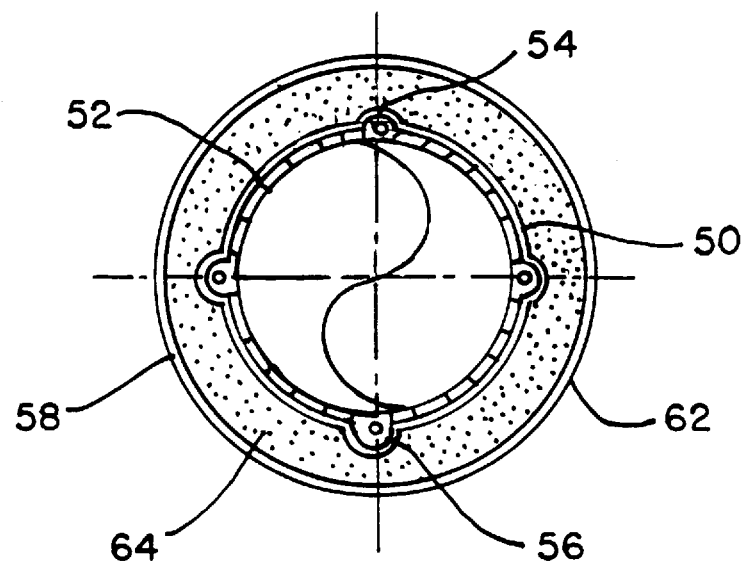

Further, in a illustrative way, the FIGS. 6A and 6B shows, respectively, cross-sections of double wall tubular cylinders 62 presenting respectively two and four internal rips 54 for arrangement and fixation of the heating extensions 56.

Figure 7A:
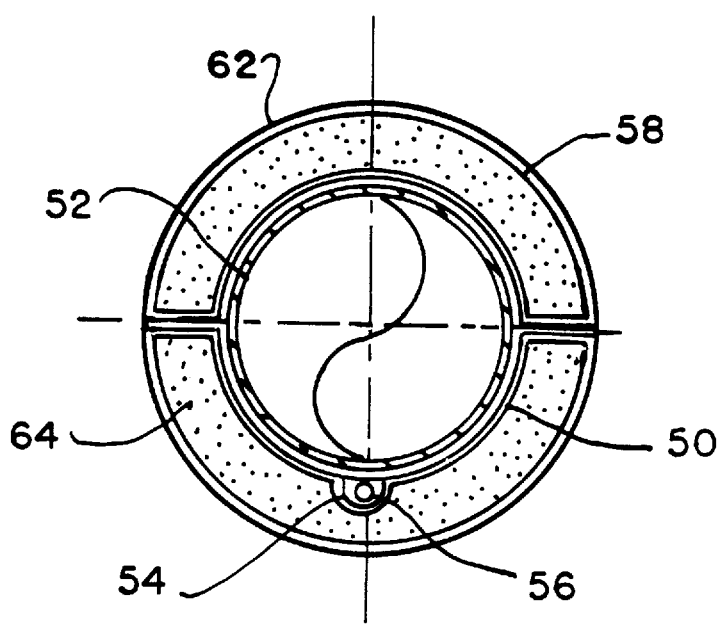
FIGS. 7A and 7B are cross-sections of double wall tubular cylinders in longitudinal bipartite configuration respectively, with one and three internal rips for arrangement and fixation of heating extensions.
Figure 7B:
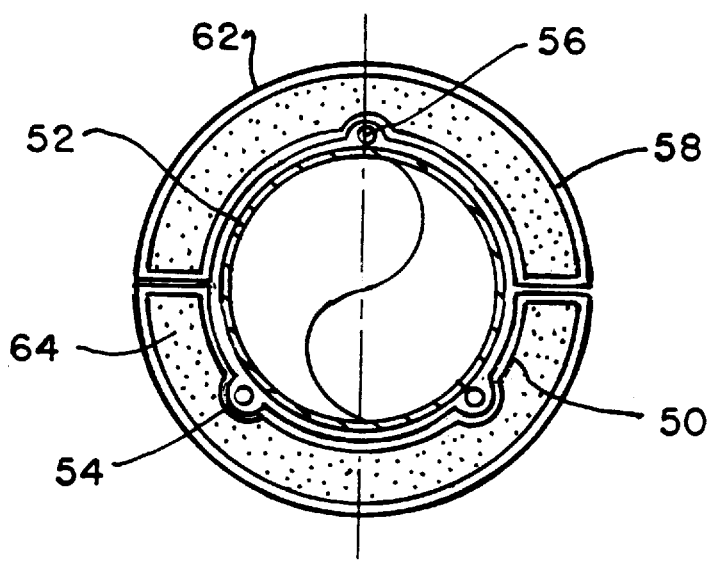
Figure 8:
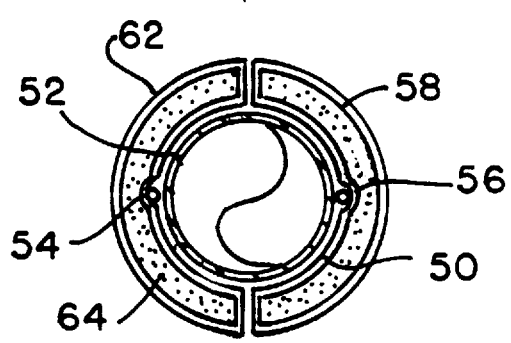
FIG. 8 is reduced cross-section of a double wall tubular cylinder in transversal bipartite configuration with two internal rips to arrangement and fixation of the heating extension.

In the same manner, the FIGS. 7A and 7B shows respectively cross-sections of double wall tubular cylinders 62 in longitudinal bipartite configuration presenting, respectively, one or three internal rips 54, while the FIG. 8 shows a reduced cross-section of a double wall tubular cylinder 62 in transversal bipartite configuration with two internal rips 54 for arrangement and fixation of the heating extension 56.

Figure 9:
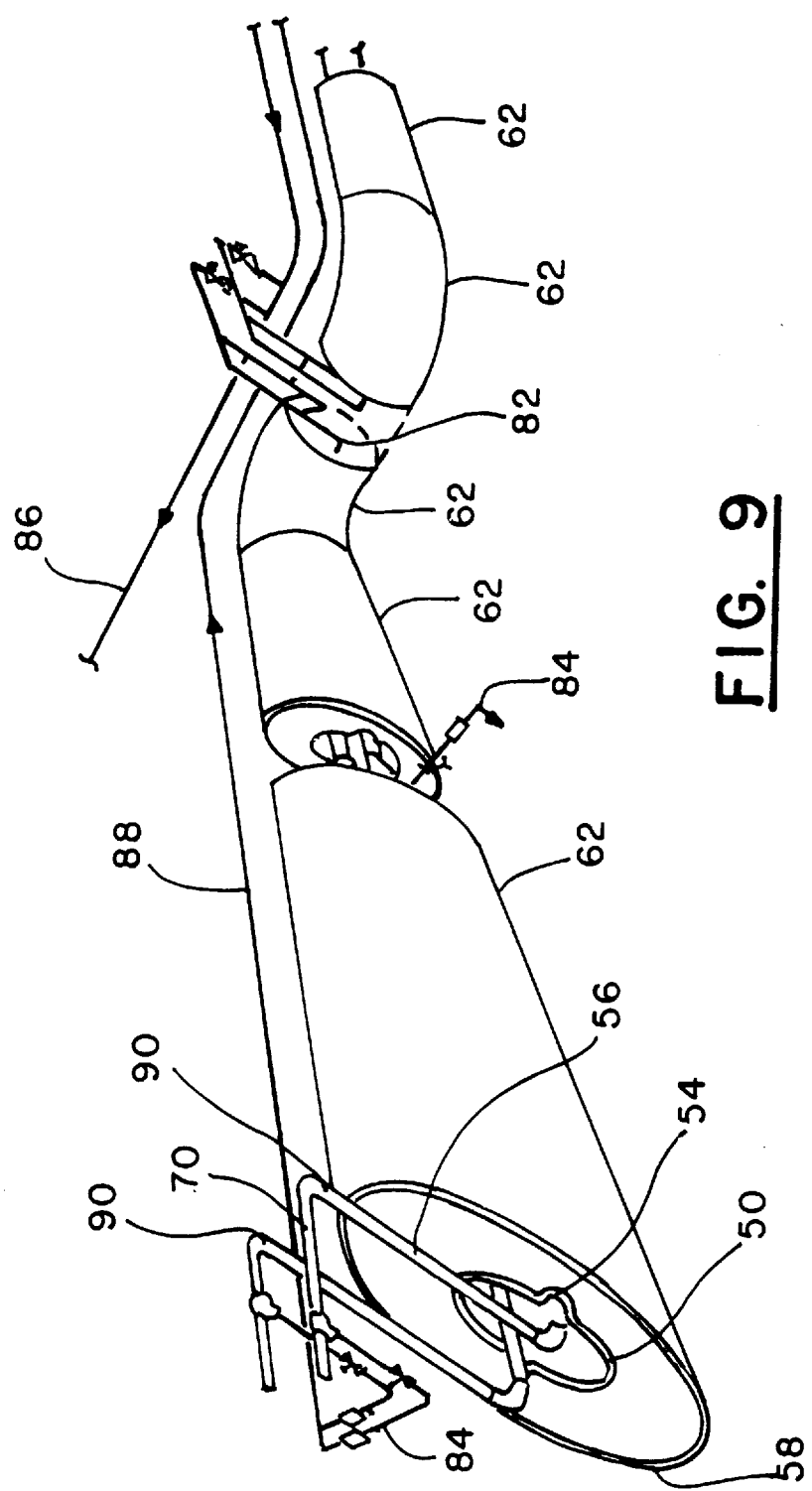
FIG. 9 is a perspective view of several double wall tubular cylinders showing the details of the steam supply and condensed waste pipes.

In FIG. 9 which shows in perspective several double wall tubular cylinders 62, are showed the interconnections of the heating extensions 56 with "simple U"-shaped outputs, being able to use for control the stop valve (globe valve) 82 and feeding steam point and waste receiver to the condensed 84, referred waste receiver being generally like a thermodynamic or of impulse one, being showed the steam main shaft 86, the condensed receiver shaft 88 and the expansors with condensed collecting pipe 90.

It provides, therefore, an insulating and fixation system of steam tracers in fluid transportation pipings which realization offers an increase of the contact of the heating extensions 56 with the fluids transportation piping 52 increasing, consequently, the heat exchange between them, avoiding extraordinarily the piping cooling with the consequent fluid viscisity increase.

What is claimed is:

1. Insulating and fixation system of steam tracers in fluid transportation pipings, comprising:
    an internal metallic piping with a larger diameter than a piping to be heated, said internal metallic piping arranged concentrically to the piping to be heated,
    a plurality of piping heating extensions, said internal metallic piping endowed with internal equally distant spaced rips in the longitudinal direction for arrangement and fixation of the piping heating extensions and a thermoplastic external piping, arranged concentrically to said internal metallic piping, forming an annular space and thereby forming a double wall tubular cylinder, said annular space formed between said internal piping and the external piping being fulfilled with insulating material, said insulating material having no contact with said piping to be heated and external surroundings wherein, an interconnection of said heating extensions in section a of said double wall tubular cylinder is comprised of with outputs forming a "simple U"-shaped.

2. Insulating and fixation system of steam tracers in fluid transportation pipings, according to claim 1, wherein said outputs forming a "simple U"-shape extend through the external piping, said external piping having a thermoplastic sleeve with superficial openings allowing said outputs forming a "simple U"-shape to extend through said external piping.

3. Insulating and fixation system of steam tracers in fluid transportation pipings, comprising:
    an internal metallic piping with a larger diameter than a piping to be heated, said internal metallic piping arranged concentrically to the piping to be heated,
    a plurality of piping heating extensions, said internal metallic piping endowed with internal equally distant spaced ribs in the longitudinal direction for arrangement and fixation of the piping heating extensions and a thermoplastic external piping, arranged concentrically to said internal metallic piping, forming an annular space and thereby forming a double wall tubular cylinder, said annular space formed between said internal piping and the external piping being fulfilled with insulating material, said insulating material having no contact with said piping to be heated and external surroundings wherein double wall tubular cylinder has a in longitudinal bipartite configuration.

4. Insulating and fixation system of steam tracers in fluid transportation pipings, comprising:
    an internal metallic piping with a larger diameter than a piping to be heated, said internal metallic piping arranged concentrically to the piping to be heated,
    a plurality of piping heating extensions, said internal metallic piping endowed with internal equally distant spaced ribs in the longitudinal direction for arrangement and fixation of the piping heating extensions and a thermoplastic external piping, arranged concentrically to said internal metallic piping, forming an annular space and thereby forming a double wall tubular cylinder, said annular space formed between said internal piping and the external piping being fulfilled with insulating material, said insulating material having no contact with said piping to be heated and external surroundings wherein said double wall tubular cylinder has a bipartite configuration.

5. Insulating and fixation system of steam tracers in fluid transportation pipings, according to claim 1, wherein an interconnection of said heating extensions in the section of said double wall tubular cylinder to be made by longitudinal surfaces.

* * * * *